United States Patent
Ikeda

(10) Patent No.: US 11,599,969 B2
(45) Date of Patent: Mar. 7, 2023

(54) IMAGE PROCESSING APPARATUS AND NON-TRANSITORY COMPUTER READABLE MEDIUM STORING IMAGE PROCESSING PROGRAM

(71) Applicant: FUJIFILM Business Innovation Corp., Tokyo (JP)

(72) Inventor: Kazutoshi Ikeda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 429 days.

(21) Appl. No.: 16/726,191

(22) Filed: Dec. 23, 2019

(65) Prior Publication Data
US 2020/0372606 A1 Nov. 26, 2020

(30) Foreign Application Priority Data
May 23, 2019 (JP) .............................. JP2019-096459

(51) Int. Cl.
*G06T 3/20* (2006.01)
*G06T 3/60* (2006.01)
*G06F 3/04845* (2022.01)

(52) U.S. Cl.
CPC ............ *G06T 3/20* (2013.01); *G06F 3/04845* (2013.01); *G06T 3/60* (2013.01); *G06T 2207/20104* (2013.01)

(58) Field of Classification Search
None
See application file for complete search history.

(56) References Cited

U.S. PATENT DOCUMENTS

| | | | | |
|---|---|---|---|---|
| 2010/0137026 A1* | 6/2010 | Kim | ...................... | H04N 9/3173 345/173 |
| 2012/0017177 A1* | 1/2012 | Kim | ...................... | G06F 3/04886 715/828 |
| 2014/0009415 A1* | 1/2014 | Nishida | .................. | G06F 3/0416 345/173 |
| 2016/0092080 A1* | 3/2016 | Swanson | .............. | G06F 3/04883 345/654 |
| 2017/0116707 A1* | 4/2017 | Upendran | .............. | G06F 16/583 |

FOREIGN PATENT DOCUMENTS

JP 2003-032507 1/2003

* cited by examiner

*Primary Examiner* — Saptarshi Mazumder
(74) *Attorney, Agent, or Firm* — JCIPRNET

(57) ABSTRACT

An image processing apparatus includes a display section that displays a background image and a processing target image on a display screen, a receiving section that receives an input position on the display screen input by user, and a processing section that processes editing to the processing target image based on a relationship between the input position and a position of the processing target image.

18 Claims, 16 Drawing Sheets

FIG. 9

| | Positional Relationship | | Click/Move | Processing |
|---|---|---|---|---|
| | Inside/Outside Processing Target Image (912) | Up-Down-Right-Left (914) | (916) | (920) |
| | Outside | Immediately Above, Immediately Below | Click | Vertically Reverse |
| | Outside | Immediately Left, Immediately Right | Click | Horizontally Reverse |
| | Inside | Center Portion | Move | Move |
| | Outside | Periphery | Move | Rotation |
| | Inside | Periphery | Move | Move, Enlargement, Color Conversion |
| | ... | ... | ... | ... |

900 ↗

FIG. 13
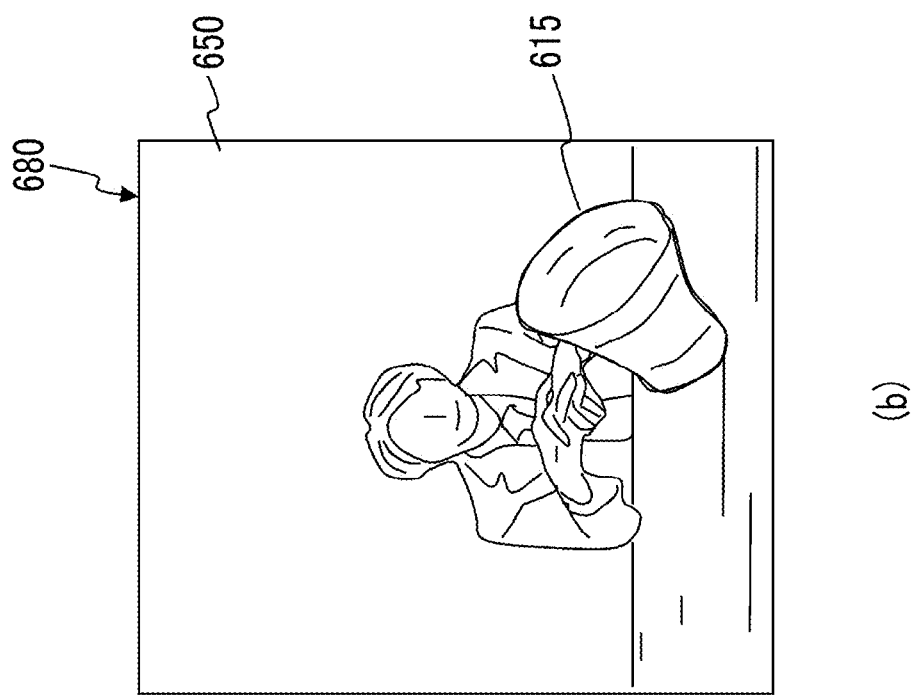
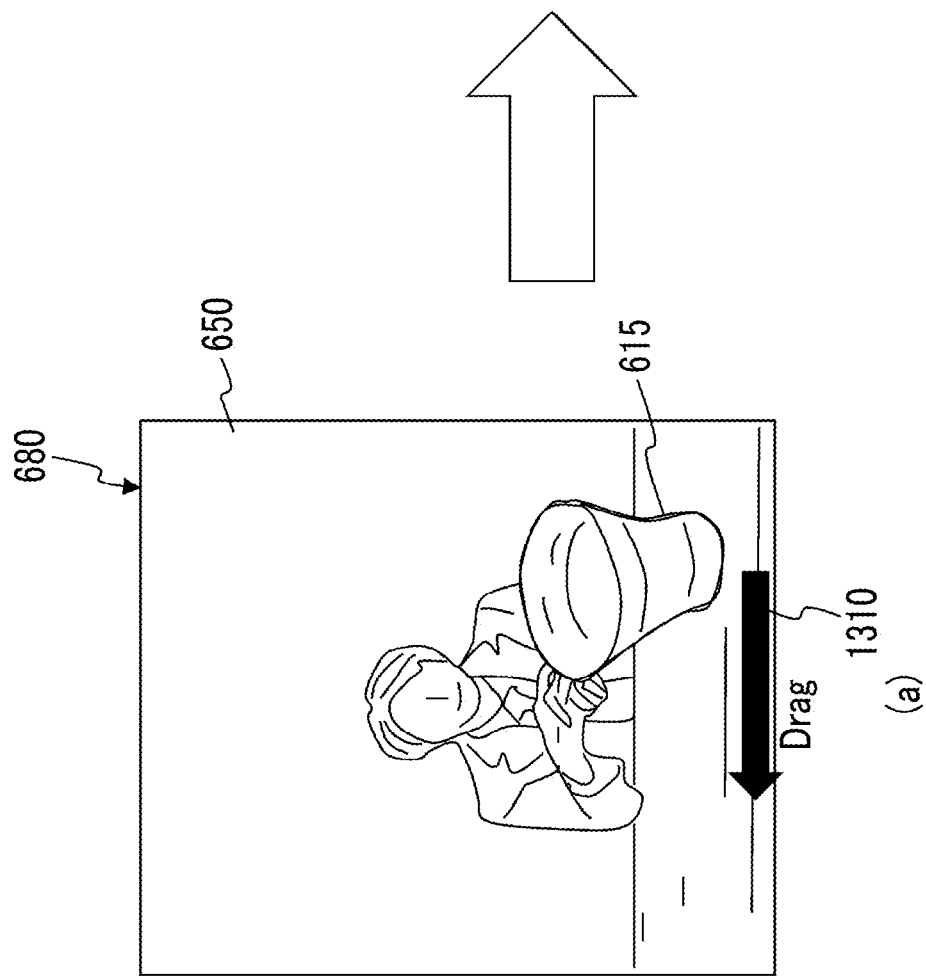

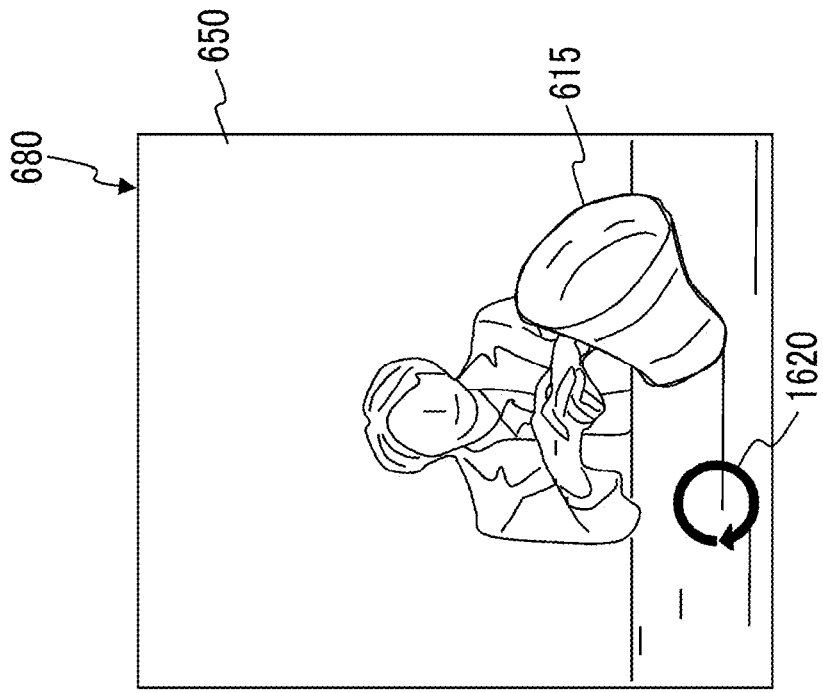
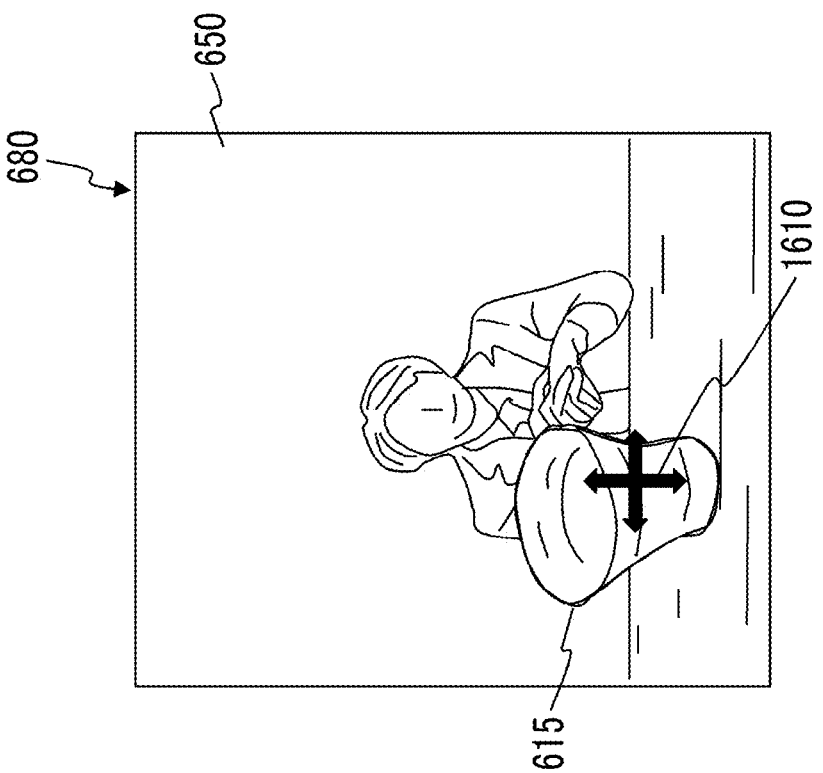

IMAGE PROCESSING APPARATUS AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2019-096459 filed May 23, 2019.

BACKGROUND

(i) Technical Field

The present invention relates to an image processing apparatus and a non-transitory computer readable medium storing an image processing program.

(ii) Related Art

JP2003-032507A discloses the following. An object thereof is to provide an easy-to-use remote control system. First display means displays remote controller-side display information. In a case where remote controller-side display information is selected by a first operation means and is dragged to a video display device, a display position of the remote controller-side display information on a display screen of the first display means is visually moved to the video display device. Thus, operation information associated with the remote controller-side display information is transmitted from first communication means to second communication means in accordance with a moving operation of the remote controller-side display information.

SUMMARY

When an image displayed on a display screen is processed, a region for displaying an operation menu is required for selecting the processing from various types of edit.

Aspects of non-limiting embodiments of the present disclosure relate to an image processing apparatus and a non-transitory computer readable medium storing image processing program for suppressing a display of an operation menu in processing an image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The gist of the present invention for achieving the object lies in the following inventions.

According to an aspect of the present disclosure, there is provided an image processing apparatus including a display section that displays a background image and a processing target image on a display screen, a receiving section that receives an input position on the display screen input by user, and a processing section that processes editing to the processing target image based on a relationship between the input position and a position of the processing target image.

BRIEF DESCRIPTION OF THE DRAWINGS

Exemplary embodiment(s) of the present invention will be described in detail based on the following figures, wherein:

FIG. 9 is a diagram illustrating a data structure example of a positional relationship-corresponding processing table;

FIG. 13 is a diagram illustrating a process example according to the exemplary embodiment;

FIGS. 16A and 16B are diagrams illustrating a process example according to the exemplary embodiment;

DETAILED DESCRIPTION

Hereinafter, with reference to the drawings, a description will be made of an exemplary embodiment for realizing the invention.

Figure 1:
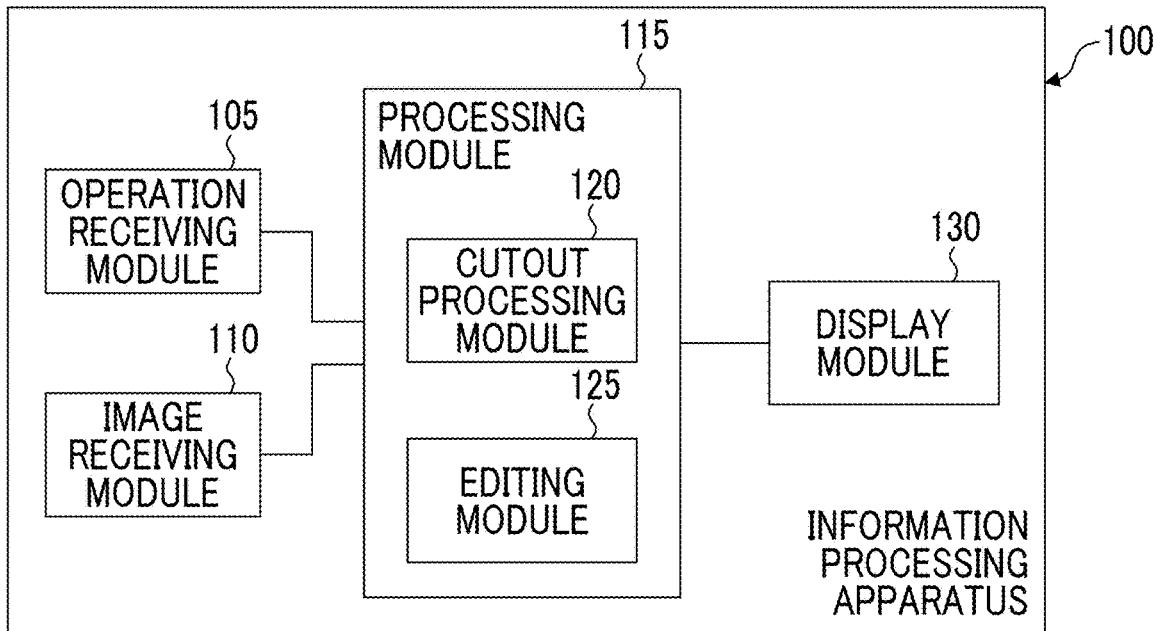
FIG. 1 is a conceptual module configuration diagram illustrating a configuration example in the exemplary embodiment.

FIG. 1 is a conceptual module configuration diagram illustrating a configuration example according to the exemplary embodiment.

The module generally indicates components such as software (including a computer program as an interpretation of "software") or hardware which may be logically divided. Therefore, the module in the exemplary embodiment indicates not only a module in a computer program but also a module in a hardware configuration. Therefore, in the exemplary embodiment, a description will also be made of a computer program (for example, a program causing a computer to execute each procedure, a program causing a computer to function as each means, or a program a computer to realize each function), a system, and a method for functioning as such a module. However, for convenience of description, "storing", "being stored", or words equivalent thereto are used, but these words indicate that a storage device stores data or a storage device is controlled to store data in a case where an exemplary embodiment is a computer program. A module may correspond to a function on a one-to-one basis, and, in installation, a single module may be configured with a single program, a plurality of modules may be configured with a single program, and, conversely, a single module may be configured with a plurality of programs. The plurality of modules may be executed by a single computer, and a single module may be executed by a plurality of computers in a distributed or parallel environment. Other modules may be included in a single module. Hereinafter, the term "connection" indicates not only physical connection but also logical connection (for example, transmission and reception of data, an instruction, a reference relationship between pieces of data, login, and the like). The term "being predetermined" indicates that setting is performed prior to a target process, and indicates not only that setting is performed before a process according to the exemplary embodiment is started but also that, even after a process according to the exemplary embodiment is started, setting is performed depending on a situation or a state at the time or a situation or a state hitherto in a case where a target process is not performed. In a case where there are "a plurality of predetermined values", the values may be different from each other, and two or more values may be the same as each other ("two or more values", of course, include all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless otherwise mentioned, and a case where only one thereof (for example, only A) is selected is included.

A system or an apparatus also includes not only a case where a plurality of computers, pieces of hardware, and apparatuses are configured to be connected to each other via communication means such as a network ("network" includes communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (that is, social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk drive, a random access memory (RAM, for short), an external storage medium, a storage device connected via a communication line, a register in a central processing unit (CPU, for short), or the like.

An information processing apparatus 100 according to the exemplary embodiment has a function to edit an image and includes an operation receiving module 105, an image receiving module 110, a processing module 115, and a display module 130, as illustrated in the example in FIG. 1.

The display module 130 is connected to the processing module 115. The display module 130 displays an image including a processing target image and background image on a display screen. For example, the display module may display an image by controlling a liquid crystal display or an organic electroluminescence display that also serves as a touch panel, or may provide a message of a user by sound output using a speaker or tactile sensation using a tactile device.

An image displayed on the display screen is divided into a region for a processing target and a region except for the processing target. For example, an image which is cut out as a processing target by a cutout processing module 120 and a background image being an image as a background to which the above image is pasted may be provided. In a case of an image constituting by two layers or more, an image of a layer in which an image of a processing target is provided, and an image of other layers may be provided.

In a case of designating a processing target, the processing target may be designated by an operation of a user or may be designated by an application program.

The operation receiving module 105 is connected to the processing module 115. The operation receiving module 105 receives a position on a display screen on which a display is performed by the display module 130. The position is designated by an operation of the user. For example, an operation of the user is received by controlling a liquid crystal display also serving as a touch panel. In addition, the operation of the user may be received with a mouse, a keyboard, a camera, a microphone, or the like.

"The operation" received by the operation receiving module 105 may include a gesture. For example, an operation using a mouse, a keyboard, or the like may be received, or an operation of the user may be received by controlling the touch panel described above. In addition, the operation (including a line of vision, sound, for example) of the user using a camera, a microphone, or the like may be received. In a case using a touch panel, the type of processing may be selected in accordance with the trajectory of position of a finger touching the touch panel or the number of fingers (or pens) touching the touch panel.

The image receiving module 110 is connected to the processing module 115. The image receiving module 110 receives an image set as a target. For example, the image receiving module may receive two images which are an image as a background and an image as a processing target. Receiving an image includes, for example, a case of reading an image with a scanner, a camera, or the like, a case of receiving an image from an external device via a communication line by a facsimile or the like, and a case of reading an image stored in a hard disk or the like (including a case of being connected via a communication line in addition to a case of being mounted in a computer). The image may be a binary image or a multi-level image (including a color image). The content of an image to be received may include a photograph taken by a camera, a document used for business, a pamphlet for advertisement, and the like.

The processing module 115 includes the cutout processing module 120 and an editing module 125 and is connected to the operation receiving module 105, the image receiving module 110, and the display module 130. The processing module 115 performs cutting-out or editing on an image received by the image receiving module 110.

The cutout processing module 120 cuts out an image of a region as a processing target from the image received by the image receiving module 110. For example, the image as the processing target may be cut out by tracing the outer periphery of a region for the processing target in accordance with an operation of the user. The inside of the region as the processing target may be designated by an operation of the user, and the outside of the region as the processing target may be designated by an operation of the user. The image as the processing target may be cut out from the above two operations.

The editing module 125 performs processing of composing an image of the processing target on a background image. The editing module 125 performs editing on the processing target based on a relationship between the position received by the operation receiving module 105 and the image of the processing target.

The editing module 125 may preserve a plurality of types of edit for relationships between the position and the processing target.

The editing module 125 may select any of a plurality of types of edit and perform the selected edit.

In this case, when the operation receiving module 105 receives the position, the display module 130 may display information for identifying the currently-selected edit near the position.

When the operation receiving module 105 receives the position, the display module 130 may display information for identifying the corresponding edit among the plurality of types of edit, in the vicinity of the position so as to allow the user to perform selection.

In a case where the processing target and the display screen have a predetermined relationship in area or position, the editing module 125 may change edit assigned to the relationship between the position and the processing target.

"The case where the processing target and the display screen have a predetermined relationship in area or position" includes "a case where the area of the processing target and the area of the display screen have a predetermined relationship" and "a case where the position of the processing target and the position of the display screen have a predetermined relationship".

The predetermined relationship corresponds to any one of (1) a case where a proportion of the area of the processing target to the display screen is greater than or equal to or greater than a predetermined proportion, (2) a case where an area except for the processing target is smaller than or equal to or smaller than a predetermined area, and (3) a case where a distance from the processing target to an edge of the display screen is smaller than or equal to or smaller than a predetermined distance.

The editing module 125 assigns edit assigned to the outer outside of the processing target, to the inside of the processing target.

"The case where the proportion of the area of the processing target to the display screen is greater than or equal to or greater than a predetermined proportion" includes a case where it is difficult to designate the outer peripheral region of the processing target because the processing target is larger than the display screen. That is, the above case means a case where the processing target occupies most of the display screen. Specifically, the above case means a case where the area of the processing target occupies Xa % (for example, 80 as Xa) or greater of the area of the display screen.

"The case where the area except for the processing target is smaller than or equal to or smaller than a predetermined area" includes a case where it is difficult to designate the outer peripheral region of the processing target because the processing target is larger than the display screen, similar to the case where the proportion of the area of the processing target to the display screen is greater than or equal to or greater than a predetermined proportion". That is, the above case means a case where the processing target occupies most of the display screen. Specifically, the above case means a case where the area except for the processing target is equal to or smaller than an area Ya cm$^2$ (for example, 10 as Ya).

"The case where the distance from the processing target to the edge of the display screen is smaller than or equal to or smaller than a predetermined distance" includes a case where it is difficult to designate the outer peripheral region of the processing target because the processing target is close to the edge of the display screen. That is, the above case means a case where the processing target is close to any of four sides of the display screen. Specifically, the above case means a case where the distance from the edge of the processing target to the edge of the display screen is equal to or smaller than Y cm (for example, 2 as Y) and the like.

The above cases refer to a situation in which the outer periphery of the processing target is clogged, and thus it is difficult to designate the position of the outer periphery of the processing target. Thus, the editing module 125 assigns edit assigned to the outer periphery of the processing target, to the inside of the processing target. Accordingly, even in a case of designating the position inside the processing target, it is possible to perform edit which has been originally assigned to the outer periphery of the processing target. In particular, the inside of the processing target to be assigned may include a region which is in the processing target but is close to the periphery. In this case, the edit which has been originally assigned to the inside of the processing target may be assigned to the center portion of the processing target.

The predetermined relationship corresponds to any one of (1) a case where a proportion of the area of the processing target to the display screen is smaller than or equal to or smaller than a predetermined proportion, (2) a case where an area except for the processing target is greater than or equal to or greater than a predetermined area, and (3) a case where a distance from the processing target to an edge of the display screen is greater than or equal to or greater than a predetermined distance.

The editing module 125 may assign edit assigned to the inside of the processing target, to the outer periphery of processing target.

"The case where the proportion of the area of the processing target to the display screen is smaller than or equal to or smaller than a predetermined proportion" includes a case where it is difficult to designate the inner region of the processing target because the processing target is smaller than the display screen. Specifically, the above case means a case where the area of the processing target is equal to or smaller than Xb % (for example, 10 as Xb) of the area of the display screen.

"The case where the area except for the processing target is greater than or equal to or greater than a predetermined area" includes a case where it is difficult to designate the inner region of the processing target because the processing target is smaller than the display screen, similar to the case where the proportion of the area of the processing target to the display screen is smaller than or equal to or smaller than a predetermined proportion". Specifically, the above case means a case where the area except for the processing target is equal to or greater than the area Y cm$^2$ (for example, 400 as Y) of the area of the display screen.

"The case where the distance from the processing target to the edge of the display screen is greater than or equal to or greater than a predetermined distance" includes a case where it is difficult to designate the inner region of the processing target because the processing target is small. That is, the above case means a case where the processing target is far from all four sides of the display screen. Specifically, the above case means a case where all distances from the edge of the processing target to the edges of the display screen, which are four sides are equal to or greater than Yb cm (for example, 10 as Yb) and the like.

The above cases refer to a situation in which the processing target is small, and thus it is difficult to designate the position inside the processing target. Thus, the editing module 125 assigns edit assigned to the inside of the processing target, to the outer periphery of the processing target. Accordingly, even in a case of designating the position of the outer periphery of the processing target, it is possible to perform edit which has been originally assigned to the inside of the processing target. In particular, the outer periphery of the processing target may include a region which is outside the processing target but is close to the periphery. In this case, the edit which has been originally assigned to the inside of the processing target may be assigned to the center portion of the processing target.

Even in a case where the processing target and the display screen have the predetermined relationship in area or position, the editing module 125 may not change edit assigned to the center portion of the processing target.

Here, "the center portion" may refer to only a single center point or a region including the center. A region of the center portion may be a closed region and may be a circle, an ellipse, and a rectangle, for example.

The editing module 125 assigns edit to a section obtained by division into a region of the processing target and a region of the outer periphery of the processing target.

In this case, the operation receiving module 105 may receive consecutive positions. That is, the operation receiving module may receive not only an operation of designating one point but also an operation of drawing a line such as a straight line or a curve.

In a case where the first position among the consecutive positions received by the operation receiving module 105 is within the section, the editing module 125 may perform edit assigned to the section.

The editing module 125 assigns edit to the section obtained by division into the region of the processing target and the region of the outer periphery of the processing target.

In this case, the operation receiving module 105 may receive consecutive positions.

In a case where the last position among the consecutive positions received by the operation receiving module 105 is within the section, the editing module 125 may perform edit assigned to the section.

In a case where the first position and the last position among the consecutive positions received by the operation receiving module 105 are within the same section, the editing module 125 may perform edit assigned to the section.

In a case where the first position and the last position among the consecutive positions received by the operation receiving module 105 are within different sections, the editing module 125 may not perform edit.

The editing module 125 may perform edit on the processing target based on the relationship between the position, the trajectory of the position, and the processing target.

Here, "the position" corresponds to "the first position" among consecutive positions when edit is performed assigned to a section in a case where the first position among the consecutive positions received by the operation receiving module 105 is within the section. Here, "the position" corresponds to "the last position" among consecutive positions when edit is performed assigned to a section in a case where the last position among the consecutive positions received by the operation receiving module 105 is within the section.

"The trajectory of the position" corresponds to a so-called gesture and may include a simple designation (case where designation occurs at one position) and a case where positions at which designation occurs are consecutive. Further, examples of the latter include linear movement and rotation. In a case of a touch panel, it may be recognized as a different gesture depending on the number of fingers (or pens) to be operated.

In a case where the position received by the operation receiving module 105 is at the upper portion or the lower portion of the processing target, the image of the processing target may be vertically reversed.

Here, "the upper portion or lower portion of the processing target" includes peripheral regions which are inside the processing target and outside the processing target. Specifically, includes the upper portion or lower portion of the inside of the processing target, and an upper peripheral region or lower peripheral region outside the processing target.

In a case where the position received by the operation receiving module 105 is at the right portion or left portion of the processing target, the image of the processing target is horizontally reversed.

Here, "the right portion or left portion of the processing target" includes peripheral regions which are inside the processing target and outside the processing target. Specifically, includes the right portion or left portion of the inside of the processing target, and a right peripheral region or left peripheral region outside the processing target.

In case where the first position among the consecutive positions received by the operation receiving module 105 is inside the processing target, the editing module 125 may move the image of the processing target in accordance with a movement of the position.

In a case where the first position among the consecutive positions received by the operation receiving module 105 is outside the processing target, the editing module 125 may rotate the image of the processing target in accordance with the movement of the position.

In a case where the first position among the consecutive positions received by the operation receiving module 105 is inside the processing target, and the last position is outside the processing target, enlargement processing of the processing target may be performed in accordance with a movement of the position.

In a case where the first position among the consecutive positions received by the operation receiving module 105 is outside the processing target, and the last position is inside the processing target, reduction processing of the processing target may be performed in accordance with the movement of the position.

Figure 2:
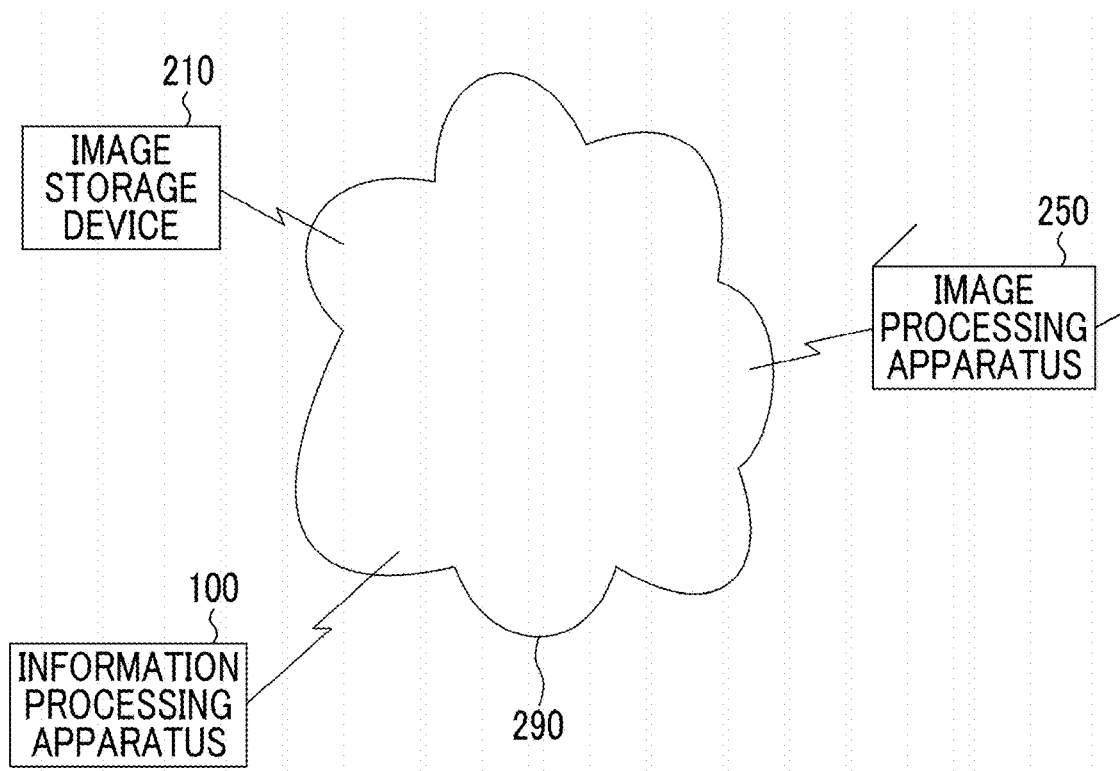
FIG. 2 is a diagram illustrating a system configuration example using the exemplary embodiment.

FIG. 2 is a diagram illustrating a system configuration example using the exemplary embodiment.

The information processing apparatus 100, an image storage device 210, and an image processing apparatus 250 are connected to each other via a communication line 290. The communication line 290 may be a wireless line, a wired line, or a combination thereof, and may be, for example, the Internet, an intranet as a communication infrastructure. The functions of the information processing apparatus 100 may be realized by a cloud service.

The image receiving module 110 in the information processing apparatus 100 receives an image stored in the image storage device 210 or an image read by a scanner of the image processing apparatus 250.

The information processing apparatus 100 edits the received image in accordance with an operation of the user. The image after edit is stored in the image storage device 210 or is output by a printer of the image processing apparatus 250.

In general, in image edit, the amount of data is large, and thus it is assumed that many operations are performed to obtain a desired product. Therefore, the number of operation menus is large, and situations as follows are assumed.

Since various operation menus are provided, it takes time to reach the operation to be performed, or it is not possible to reach the operation to be performed at first. For example, there is a deep menu hierarchy, and a category of the menu in which the operation to be performed is provided is not recognized.

There are too many operation menus, and it is necessary to make the menus small. Thus, it is difficult to see or select the menus.

Too many operation menus may be provided, a field for edit an image in a menu field may be compressed, and the field for edit an image may become narrow.

In recent years, the number of terminals such as smartphones and tablet terminals based on touch has increased, and software such as image edit is also supported. However, smartphones, tablet terminals, and the like originally have small screens and may be forced to operate with a finger larger than a mouse pointer. Thus, the above situation has become more prominent.

The information processing apparatus 100 according to the exemplary embodiment may be grasped as follows.

In the information processing apparatus 100, switching of edit is realized in a user interface of edit an image, without providing a menu field in a predetermined region on the screen. Alternatively, even in a case where the menu field is provided, the information processing apparatus 100 may widely use an image edit field.

Even in an environment in which operation means is limited such as a smartphone or a tablet terminal, in a case using the information processing apparatus 100, it is possible to realize various kinds of edit switching.

Figure 3:
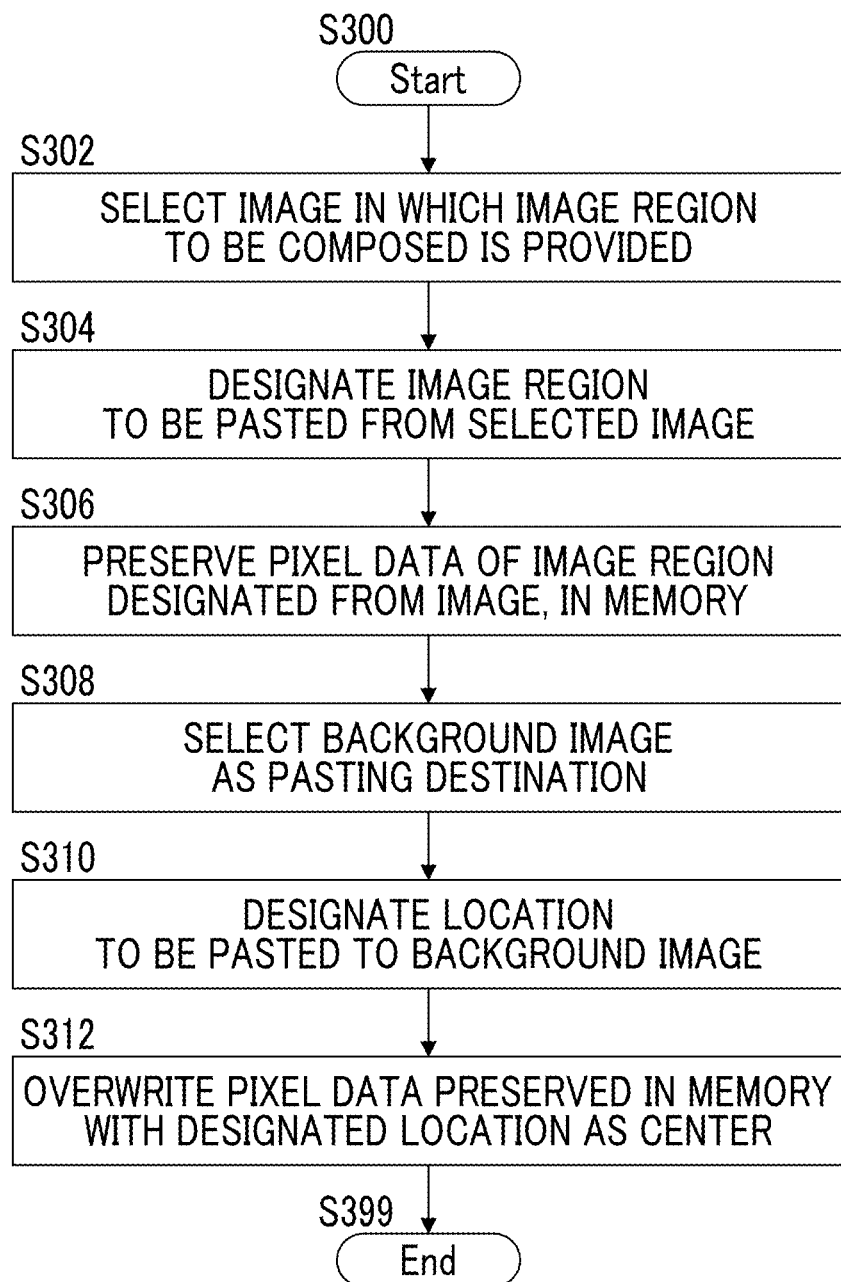
FIG. 3 is a flowchart illustrating a process example according to the exemplary embodiment.

FIG. 3 is a flowchart illustrating a process example according to the exemplary embodiment.

In Step S302, the image receiving module 110 selects an image in which an image region to be composed is provided, in accordance with an operation of a user.

In Step S304, the cutout processing module 120 designates an image region to be pasted from the selected image, in accordance with an operation of a user. That is, processing of designating an image as a processing target is performed.

Figure 4:
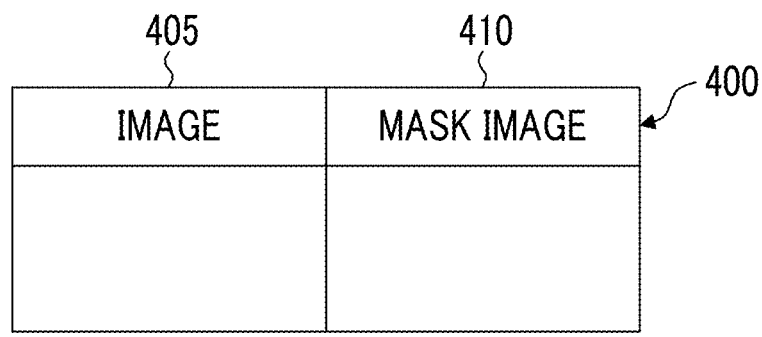
FIG. 4 is a diagram illustrating a data structure example of a processing target image information table.

In Step S306, the cutout processing module 120 preserves pixel data of the image region designated from the image, in a memory. For example, the image as the processing target may be managed in a processing target image information table 400. FIG. 4 is a diagram illustrating a data structure example of the processing target image information table 400. The processing target image information table 400 has an image field 405 and a mask image field 410. An original image is stored in the image field 405. A mask image for cutting the image as the processing target out is stored in the mask image field 410. The mask image is an image for extracting only a target region.

In Step S308, the image receiving module 110 selects a background image as a pasting destination, in accordance with an operation of the user.

In Step S310, the user designates a location to be pasted to the background image.

Figure 5:
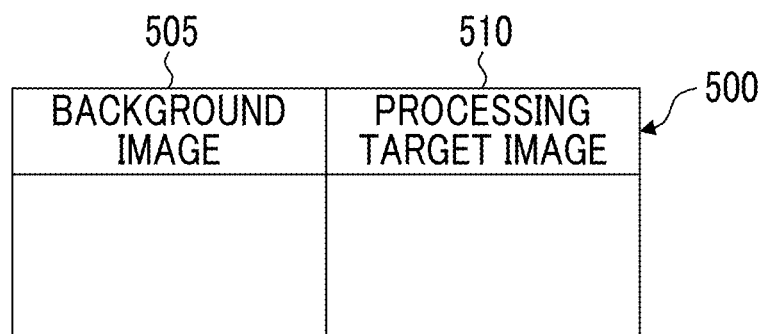
FIG. 5 is a diagram illustrating a data structure example of a background image-processing target image management table.

In Step S312, the editing module 125 overwrites the pixel data preserved in the memory with the designated location as the center. The background image and the image as the processing target may be managed, for example, using the background image-processing target image management table 500. FIG. 5 is a diagram illustrating a data structure example of a background image-processing target image management table 500.

The background image-processing target image management table 500 has a background image field 505 and a processing target image field 510. The background image is stored in the background image field 505. The image as the processing target is stored in the processing target image field 510.

Figure 6:
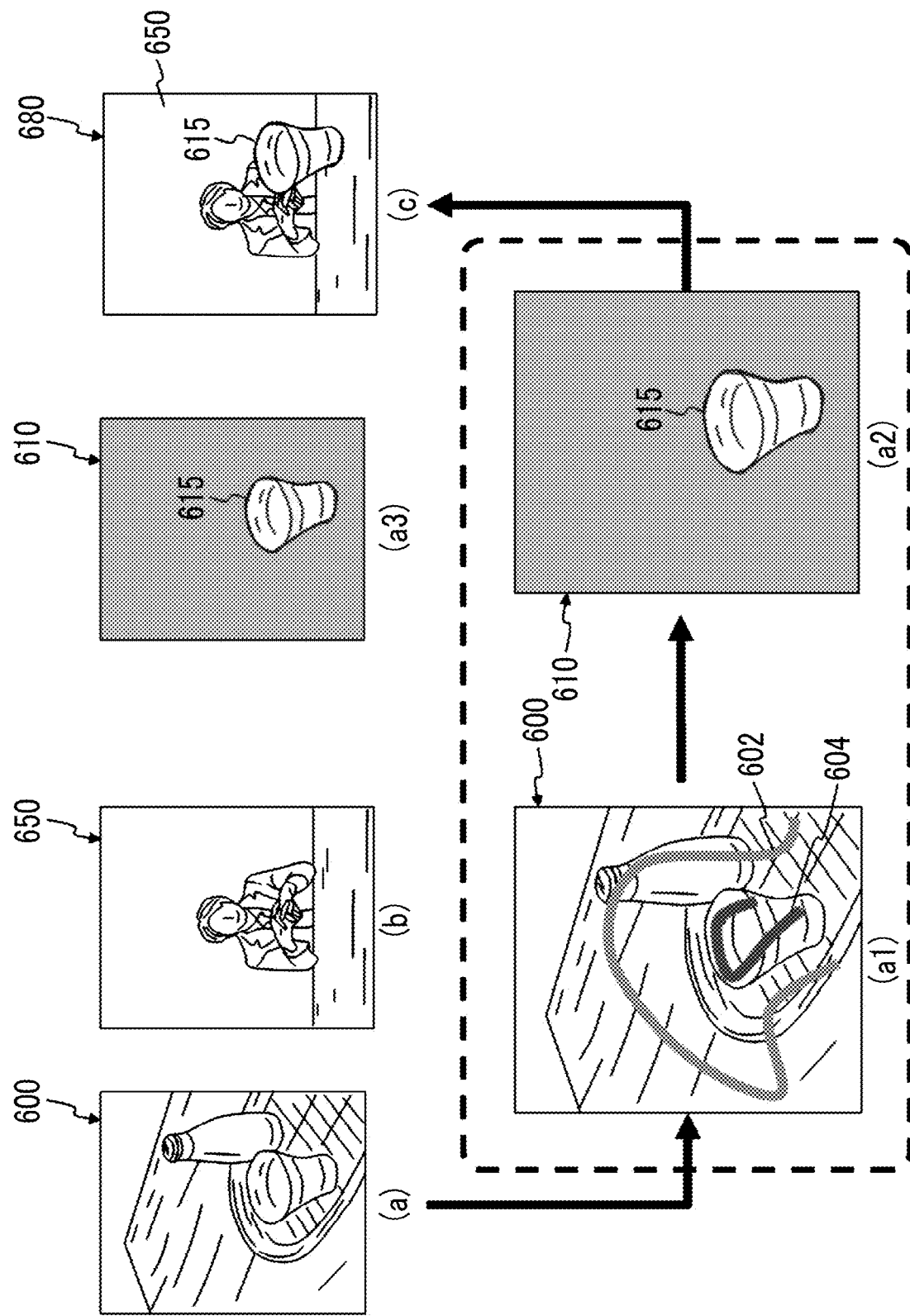
FIG. 6 is a diagram illustrating a process example according to the exemplary embodiment.

FIG. 6 is a diagram illustrating a process example according to the exemplary embodiment.

The example in (a) of FIG. 6 illustrates an original image 600 including the image as the processing target and illustrates a state before the region of the processing target is designated.

The example in (b) of FIG. 6 illustrates a background image 650 to which the image as the processing target is pasted and illustrates a state before the image of the processing target is composed.

The example in (a1) of FIG. 6 illustrates an operation of designating a portion for the processing target and a portion except for the target. That is, the example in (a1) of FIG. 6 illustrates an operation of cutting the portion for the processing target out. Here, an example in which an image of glass is set to a processing target is illustrated. The user performs a non-target designation operation 602 and a target designation operation 604. Specifically, the non-target designation operation 602 and the target designation operation 604 are performed by tracing the image 600 with a finger or the like.

In the example in (a2) of FIG. 6, a processing target image 615 is extracted. That is, the processing target image 615 may be extracted by distinguishing a region including the target designation operation 604 and a region including the non-target designation operation 602. For this, a known technique may be used.

The example in (a3) of FIG. 6 illustrates an image 610 after the processing target image 615 is extracted.

The example in (c) of FIG. 6 illustrates an example in which the processing target image 615 is composed on the background image 650. In this case, an image 680 includes two images being the background image 650 and the processing target image 615.

Figure 7:
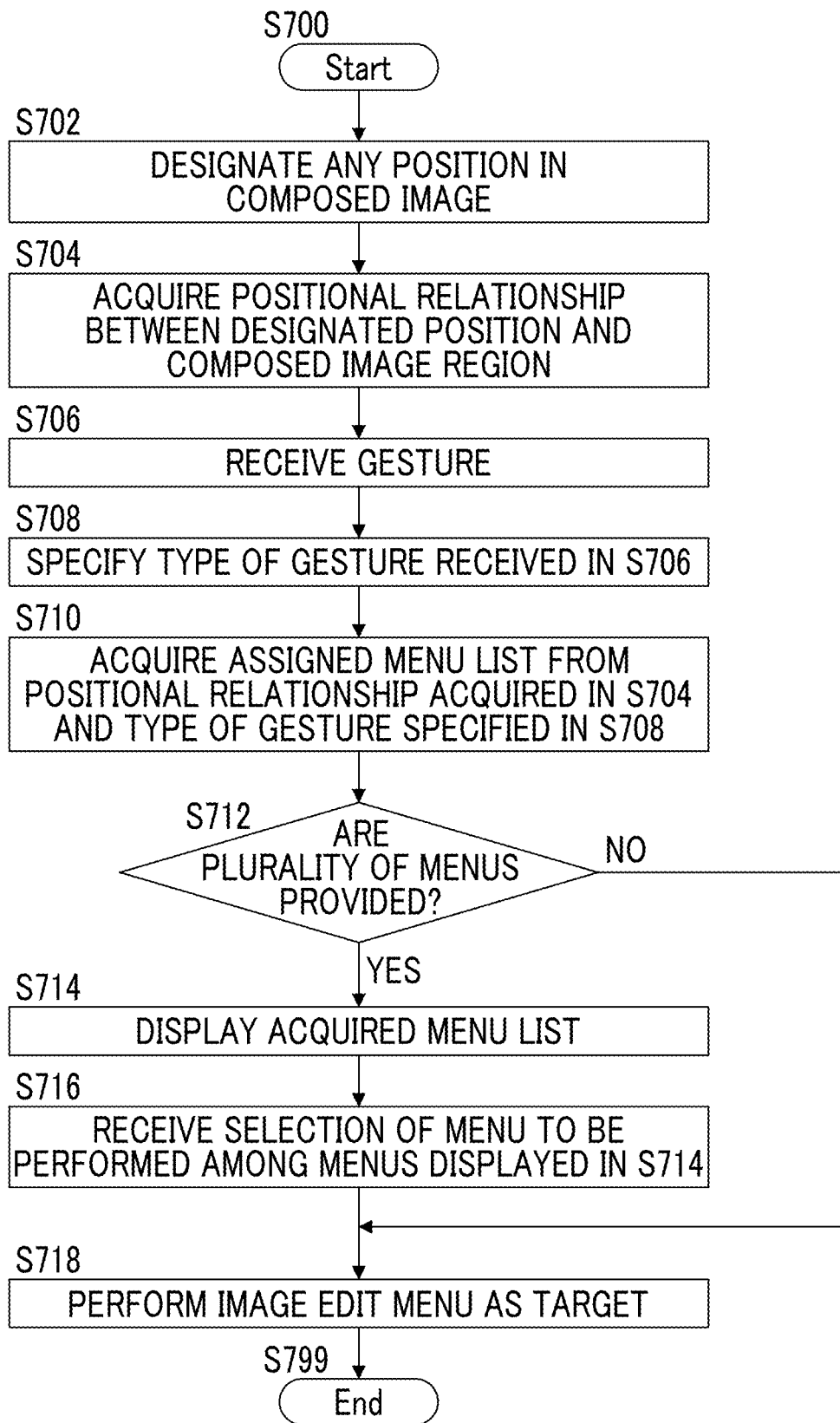
FIG. 7 is a flowchart illustrating a process example according to the exemplary embodiment.

FIG. 7 is a flowchart illustrating a process example according to the exemplary embodiment. FIG. 7 mainly illustrates a process example related to a user interface for designating edit and the edit.

Figure 8:
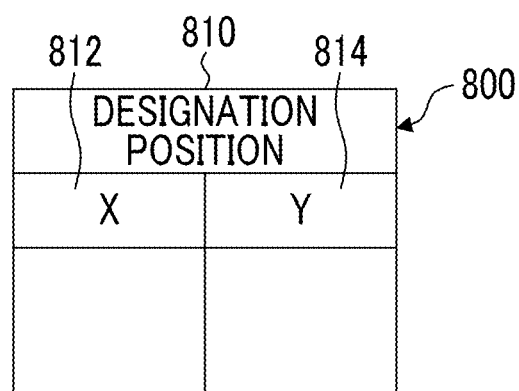
FIG. 8 is a diagram illustrating a data structure example of designation position information.

In Step S702, any position in the composed image is designated. Specifically, the user designates a location in the composed image. Edit varies depending on the location (position) designated by the user. The position is managed by designation position information 800, for example. FIG. 8 is a diagram illustrating a data structure example of the designation position information 800. The designation position information 800 has a designation position field 810. The designation position field 810 has an X field 812 and a Y field 814. A designation position is stored in the designation position field 810. An X coordinate of the designation position is stored in the X field 812. A Y coordinate of the designation position is stored in the Y field 814.

In Step S704, a positional relationship between the designation position and the composed image region (the image of the processing target) is acquired. For positional relationship, for example, a region except for the image in the image of the processing target is provided.

In Step S706, a gesture as an operation of the user is received. Examples of the gesture include so-called click, drag, swipe, pinch-in, and pinch-out.

In Step S708, the type of gesture received in Step S706 is specified.

In Step S710, an assigned menu list is acquired from the positional relationship acquired in Step S704 and the type of gesture specified in Step S708. For example, the menu list is acquired from a positional relationship-corresponding processing table 900. FIG. 9 is a diagram illustrating a data structure example of the positional relationship-corresponding processing table 900.

The positional relationship-corresponding processing table 900 has a positional relationship field 910 and a processing field 920. The positional relationship field 910 has a processing target image inside-outside field 912, an up-down-right-left field 914, and a click-move field 916. A positional relationship is stored in the positional relationship field 910. Information indicating whether the image is inside the processing target image or outside the processing target image is stored in the processing target image inside-outside field 912. The location up/down/right/left is stored in the up-down-right-left field 914. Information indicating whether an operation received by the operation receiving module 105 indicates click or moving is stored in the click-move field 916. Here, "move" indicates that the operation received by the operation receiving module 105 is "consecutive positions". Edit corresponding to the positional relationship field 910 is stored in the processing field 920.

In the positional relationship-corresponding processing table 900 illustrated in the example in FIG. 9, the first row indicates that, in a case where the position of the operation is "outside" the processing target image, and is "immediately above or immediately below" the processing target image, and the operation indicates "click", edit as the menu is "vertically reversing". The second row indicates that, in a case where the position of the operation is "outside" the processing target image, and is "on the immediately right or immediately left of" the processing target image, and the operation indicates "click", edit as the menu is "reversing right and left". The third row indicates that, in a case where the position of the operation is "inside" the processing target image, and is "at the center portion of" the processing target image, and the operation indicates "move", edit as the menu is "move". The fourth row indicates that, in a case where the position of the operation is "outside" the processing target image, and is "in the periphery of" the processing target image, and the operation indicates "move", edit as the menu is "rotation". The fifth row indicates that, in a case where the position of the operation is "inside" the processing target image, and is "in the periphery of" the processing target image, and the operation indicates "move", edit as the menu is "move, enlargement, and color conversion".

In Step S712, it is determined whether or not a plurality of menus are provided. In a case where the plurality of menus are provided, the process proceeds to Step S714. In other cases, the process proceeds to Step S718.

In Step S714, the acquired menu list is displayed. For example, the menu may be displayed near the position at which the operation is performed.

In Step S716, a selection of a menu to be performed among the menus displayed in Step S714 is received. That is, the user selects a menu to be performed from the menus displayed in Step S714.

In Step S718, an image edit menu as a target is performed.

Figure 10:
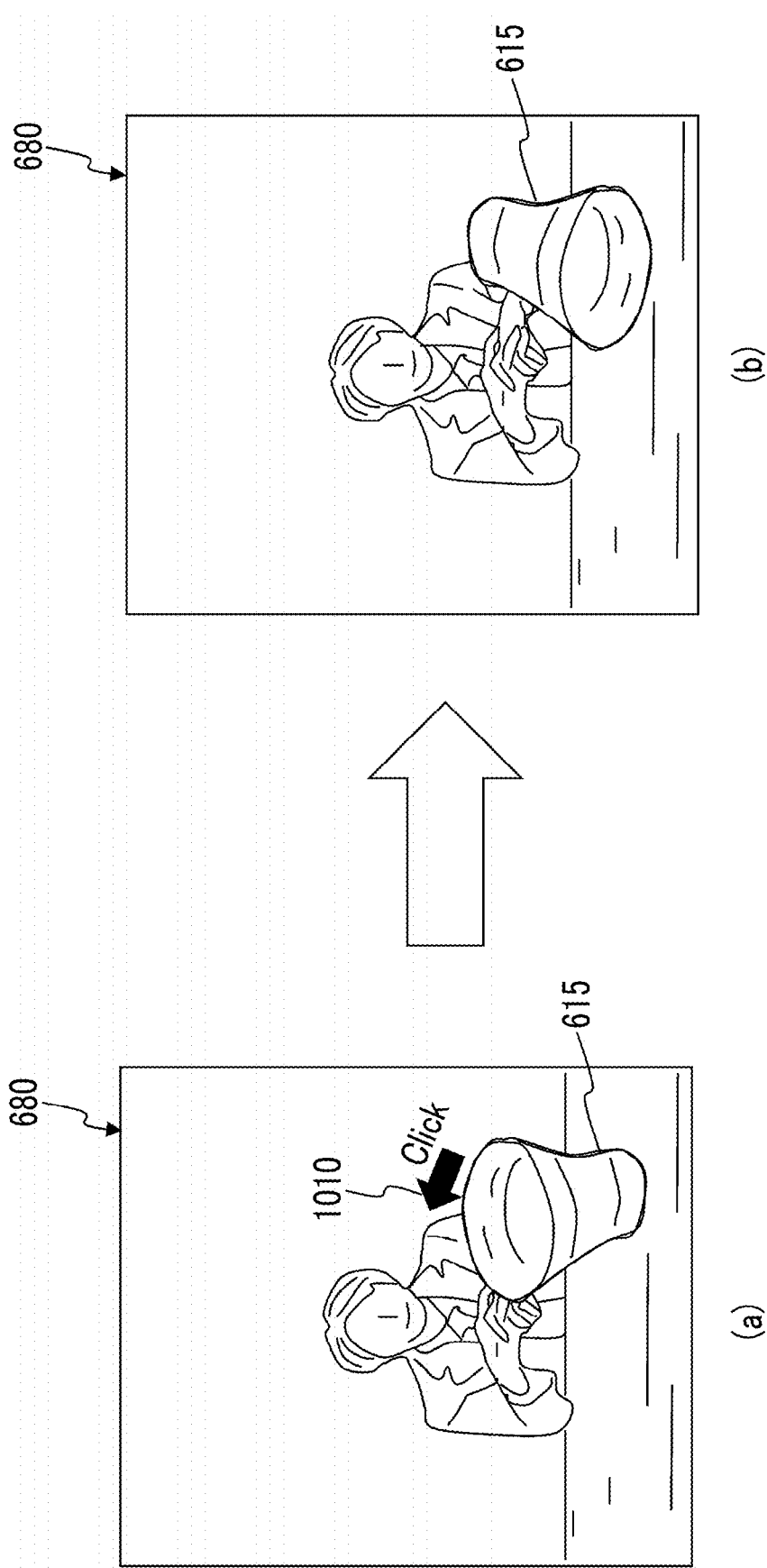
FIG. 10 is a diagram illustrating a process example according to the exemplary embodiment.

FIG. 10 is a diagram illustrating a process example according to the exemplary embodiment.

The example in (a) of FIG. 10 illustrates that the user performs a click operation 1010 on the image 680 illustrated in the example in (c) of FIG. 6.

In this case, the position of the operation 1010 is at the upper portion of the outer periphery of the processing target image 615, and the operation indicates click, and thus edit of vertically reversing the image is performed.

The example in (b) of FIG. 10 illustrates a state after the edit is completed. That is, the processing target image 615 is vertically reversed.

Figure 11:
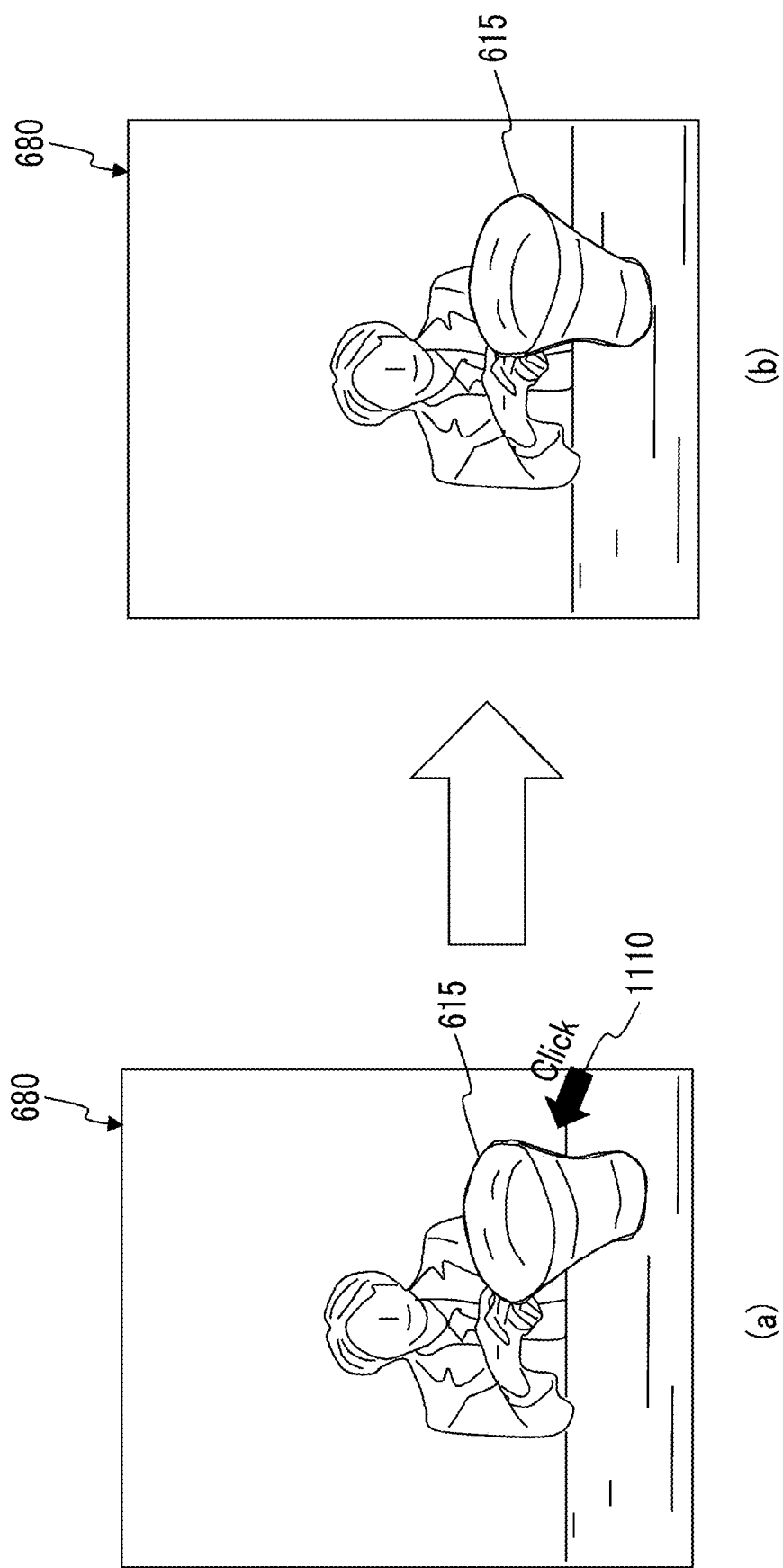
FIG. 11 is a diagram illustrating a process example according to the exemplary embodiment.

FIG. 11 is a diagram illustrating a process example according to the exemplary embodiment.

The example in (a) of FIG. 11 illustrates that the user performs a click operation 1110 on the image 680 illustrated in the example in (c) of FIG. 6.

In this case, the position of the operation 1110 is at the right portion of the outer periphery of the processing target image 615, and the operation indicates click, and thus edit of reversing the image right and left is performed.

The example in (b) of FIG. 11 illustrates a state after the edit is completed. That is, the processing target image 615 is reversed right and left.

Figure 12:
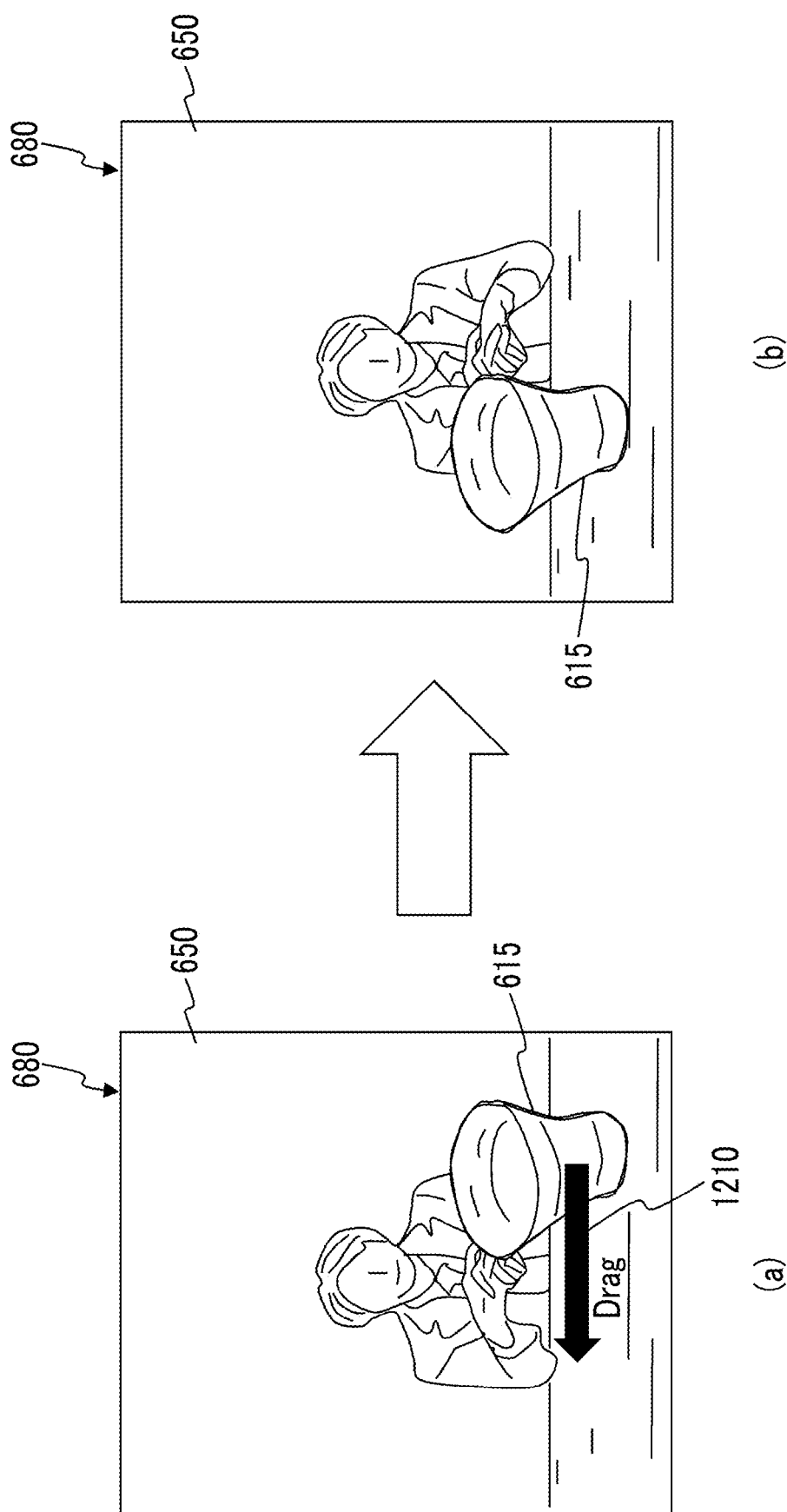
FIG. 12 is a diagram illustrating a process example according to the exemplary embodiment.

FIG. 12 is a diagram illustrating a process example according to the exemplary embodiment.

The example in (a) of FIG. 12 illustrates that the user performs a move (drag) operation 1210 on the image 680 illustrated in the example in (c) of FIG. 6.

In this case, the position of the operation 1210 is at the center portion of the processing target image 615, and the operation indicates move, and thus edit of moving in response to the operation 1210 is performed.

The example in (b) of FIG. 12 illustrates a state after the edit is completed. That is, the processing target image 615 moves to the left side in response to the operation 1210.

FIG. 13 is a diagram illustrating a process example according to the exemplary embodiment.

The example in (a) of FIG. 13 illustrates that the user performs a move (drag) operation 1310 on the image 680 illustrated in the example in (c) of FIG. 6.

In this case, the position of the operation 1310 is at the outer peripheral portion of the processing target image 615, and the operation indicates move, and thus edit of rotation in response to the operation 1310 is performed.

The example in (b) of FIG. 13 illustrates a state after the edit is completed. That is, the processing target image 615 rotates in response to the operation 1310. For example, in a case where the image moves from the first position of the operation 1310 to the last position of the operation 1310, the rotation may be performed in accordance with an angle formed by a straight line from the center of the processing target image 615 to the first position and a straight line from the center of the processing target image 615 to the last position, and a rotation direction.

Figure 14:
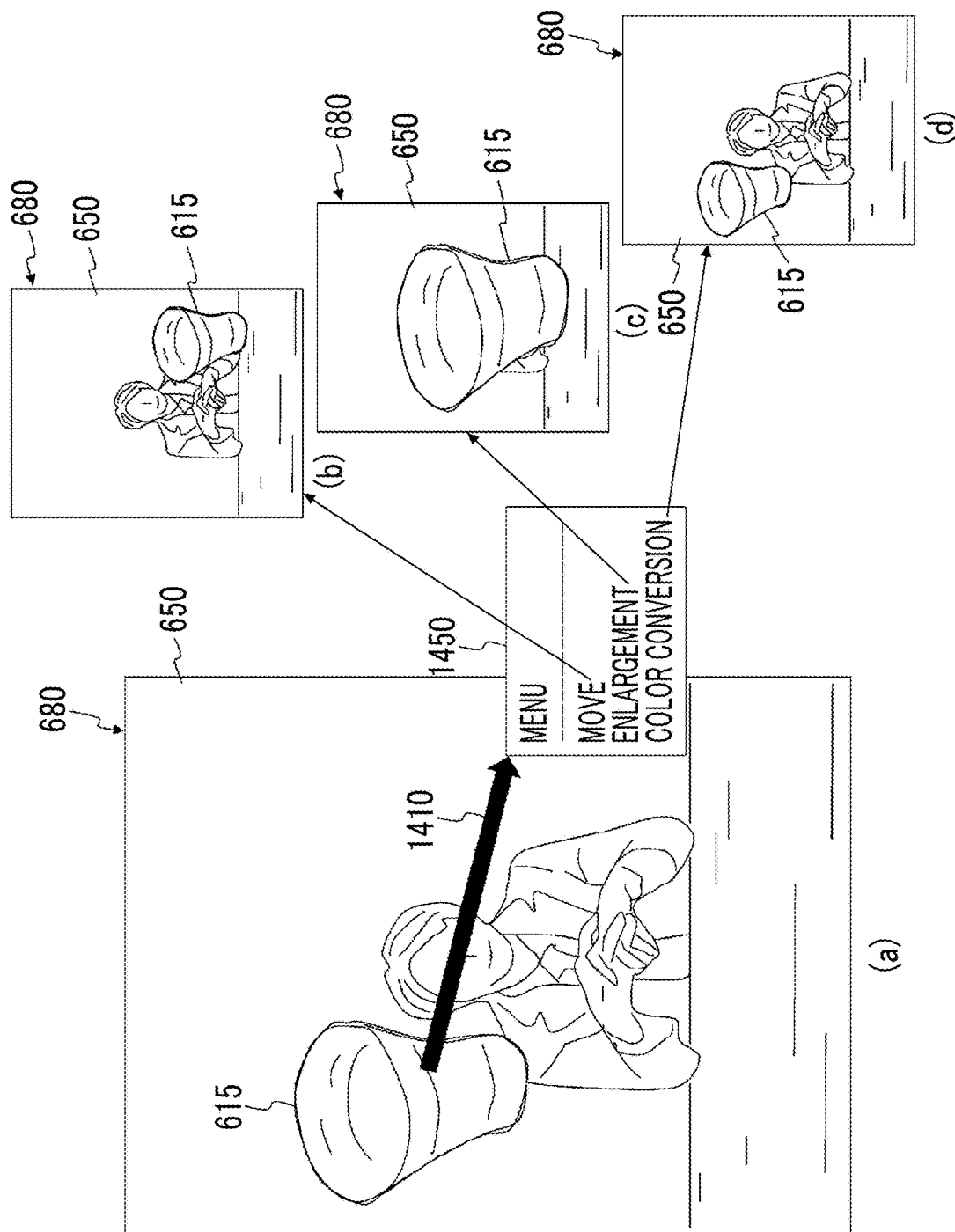
FIG. 14 is a diagram illustrating a process example according to the exemplary embodiment.

FIG. 14 is a diagram illustrating a process example according to the exemplary embodiment.

The example in (a) of FIG. 14 illustrates that the user performs a move (drag) operation 1410 on the image 680 illustrated in the example in (c) of FIG. 6.

In this case, the position of the operation 1410 is at the inner peripheral portion of the processing target image 615, and the operation 1410 indicates move, and thus edit of moving, enlargement, and color conversion corresponds to the operation. Thus, a menu 1450 is displayed close to the current position 1410. Three types of edit being moving, enlargement, and color conversion are displays in the menu 1450. The edit assigned to the operation or edit related to the edit may be displayed. A timing of displaying the menu may be the time when the operation 1410 ends or when the corresponding edit is determined. The user selects processing in the menu 1450.

The example in (b) of FIG. 14 illustrates processing in a case where "move" in the menu 1450 is selected and illustrates that the processing target image 615 is moved to the right side in response to the operation 1410.

The example in (c) of FIG. 14 illustrates processing in a case where "enlargement" of the menu 1450 is selected and also illustrates that the processing target image 615 is enlarged in response to the operation 1410.

The example in (d) of FIG. 14 illustrates processing in a case where "color conversion" of the menu 1450 is selected and also illustrates that color conversion of the processing target image 615 is performed in response to the operation 1410.

Figure 15:
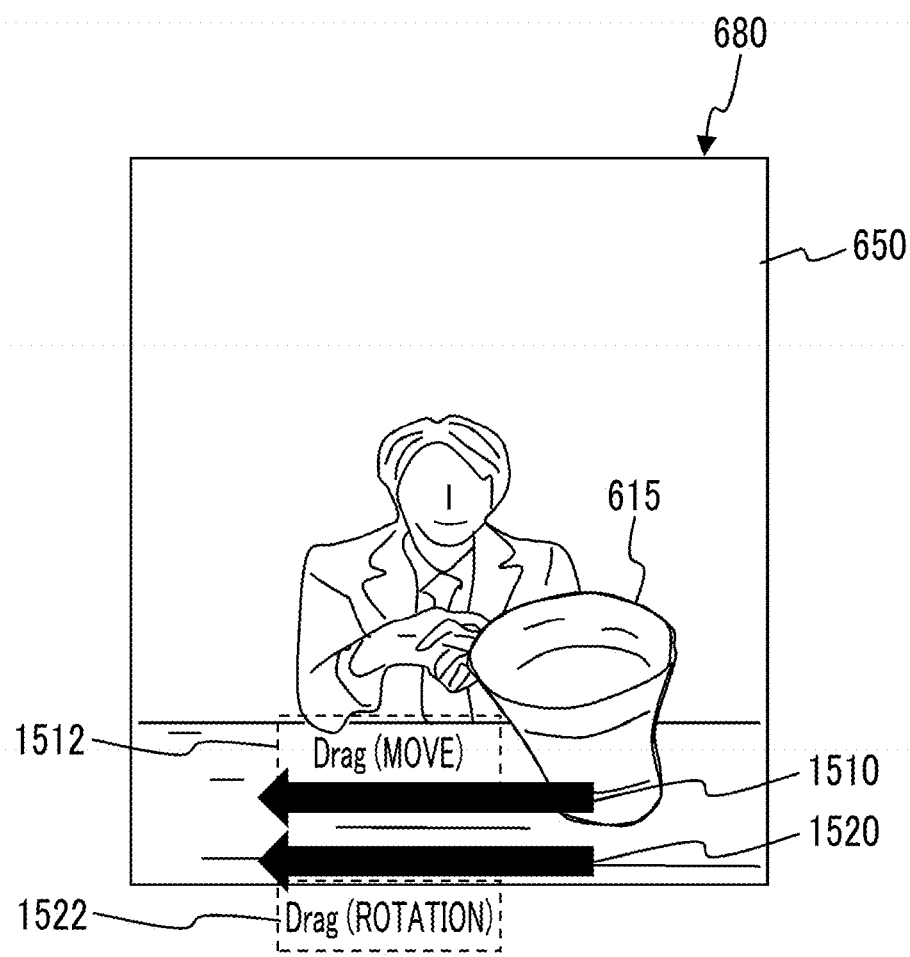
FIG. 15 is a diagram illustrating a process example according to the exemplary embodiment.

FIG. 15 is a diagram illustrating a process example according to the exemplary embodiment.

In FIG. 14, a menu is displayed in a case where the menu corresponding to a plurality of types of edit is provided. However, even in a case of one type of edit, information for identifying edit which has currently corresponded may be displayed.

In the example in FIG. 15, an operation 1510 indicates movement from the center portion of the processing target image 615, and thus "Drag (move)" is displayed as a processing explanation 1512.

Since the operation 1520 indicates movement from the peripheral portion being the outside of the processing target image 615, "Drag (rotation)" is displayed as a processing explanation 1522.

As described above, in a case of operations such as movement and rotation, which are similar to each other, in order to make it easier for the user to determine edit to be performed, an icon for identifying the corresponding edit is displayed at the current operation position.

FIGS. 16A and 16B are diagrams illustrating a process example according to the exemplary embodiment. In the example in FIG. 15, the currently corresponding edit is displayed by text, but the corresponding edit may be displayed by a figure such as an icon.

In the example illustrated in FIG. 16A, a movement icon 1610 indicating movement edit is displayed. For example, red up, down, right, and left arrows may be displayed as the movement icon 1610.

In the example illustrated in FIG. 16B, a rotation icon 1620 indicating rotation edit is displayed. For example, a red circular arrow may be displayed as the rotation icon 1620.

Figure 17:
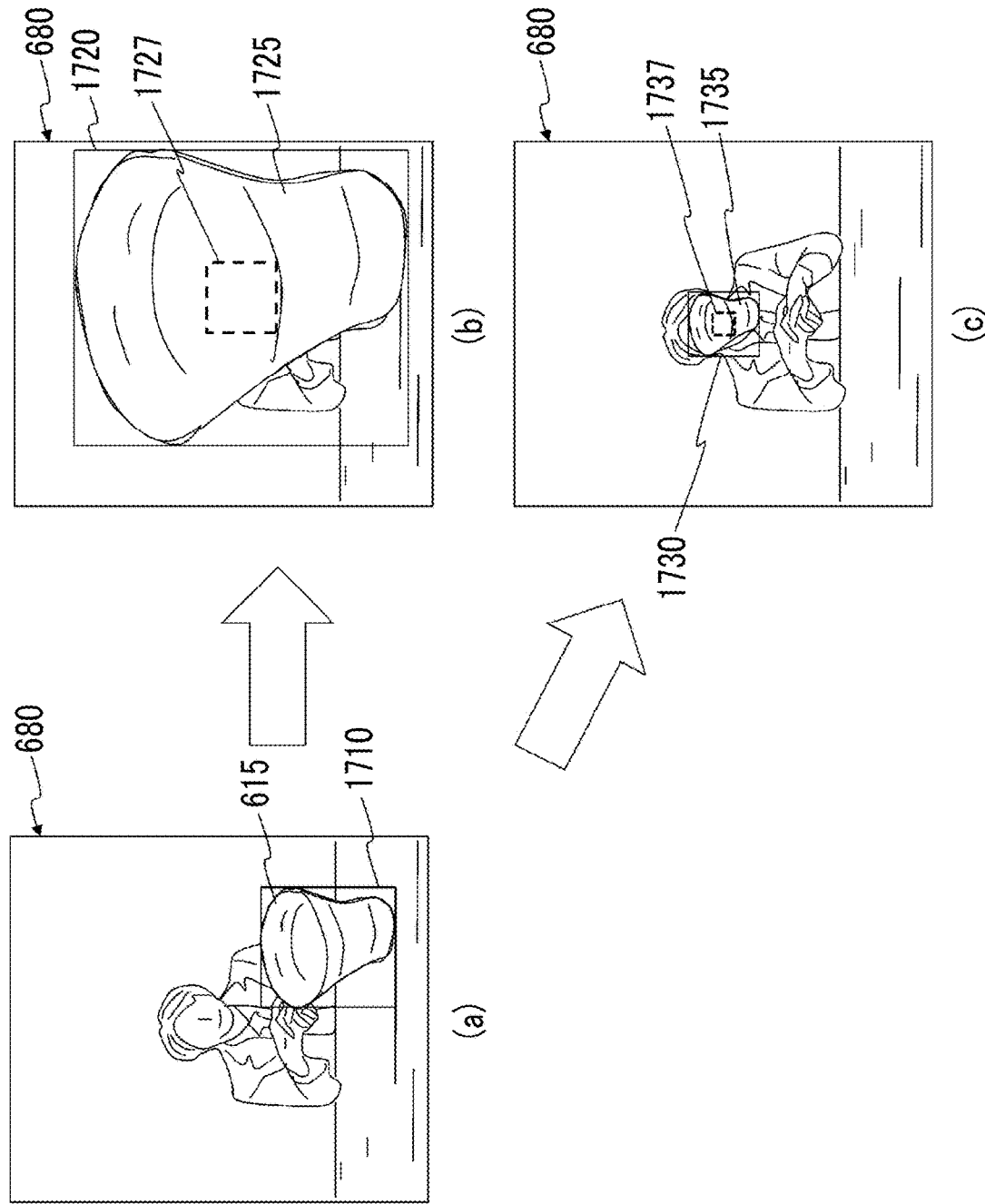
FIG. 17 is a diagram illustrating a process example according to the exemplary embodiment.

FIG. 17 is a diagram illustrating a process example according to the exemplary embodiment.

The example in (c) of FIG. 17 is equivalent to the image 680 illustrated in the example in (c) of FIG. 6. In this case, the positional relationship-corresponding processing table 900 illustrated in the example in FIG. 9 is used as it is. Whether or not the position is outside the processing target image 615 may be determined using a circumscribed rectangle 1710 of the processing target image 615.

As illustrated in (b) of FIG. 17, in a case where the processing target image 615 is enlarged, and as a result, the area of a processing target image 1725 is much larger than the area of the image 680, or the position of the processing target image 1725 is close to the edge of the image 680, edit assigned to the periphery being the outside of the processing target image 1725 may be assigned to the inside of the processing target image 1725. Whether or not the position is outside the processing target image 1725 may be determined using a circumscribed rectangle 1720 of the processing target image 1725. In this case, edit assigned to the outer peripheral portion of the circumscribed rectangle 1720 is assigned to the inner peripheral portion of the circumscribed rectangle 1720. Even in a case where the area of the processing target image 1725 is much larger than the area of the image 680, or the position of the processing target image 1725 is close to the edge of the image 680, edit assigned to a center portion 1727 of the processing target image 1725 (circumscribed rectangle 1720) is set to not be changed.

Reversely, as illustrated in (c) of FIG. 17, in a case where the processing target image 615 is reduced, and as a result, the area of a processing target image 1735 is much smaller than the area of the image 680, or the position of the processing target image 1735 is at the center portion of the image 680, edit assigned to the periphery being the inside of the processing target image 1735 may be assigned to the outside of the processing target image 1735. Whether or not the position is outside the processing target image 1735 may be determined using a circumscribed rectangle 1730 of the processing target image 1735. In this case, edit assigned to the inner peripheral portion of the circumscribed rectangle 1730 is assigned to the outer peripheral portion of the circumscribed rectangle 1730. Even in a case where the area of the processing target image 1735 is much smaller than the area of the image 680, or the position of the processing target image 1735 is at the center portion of the image 680, edit assigned to a center portion 1737 of the processing target image 1735 (circumscribed rectangle 1730) is set to not be changed.

Figure 18:
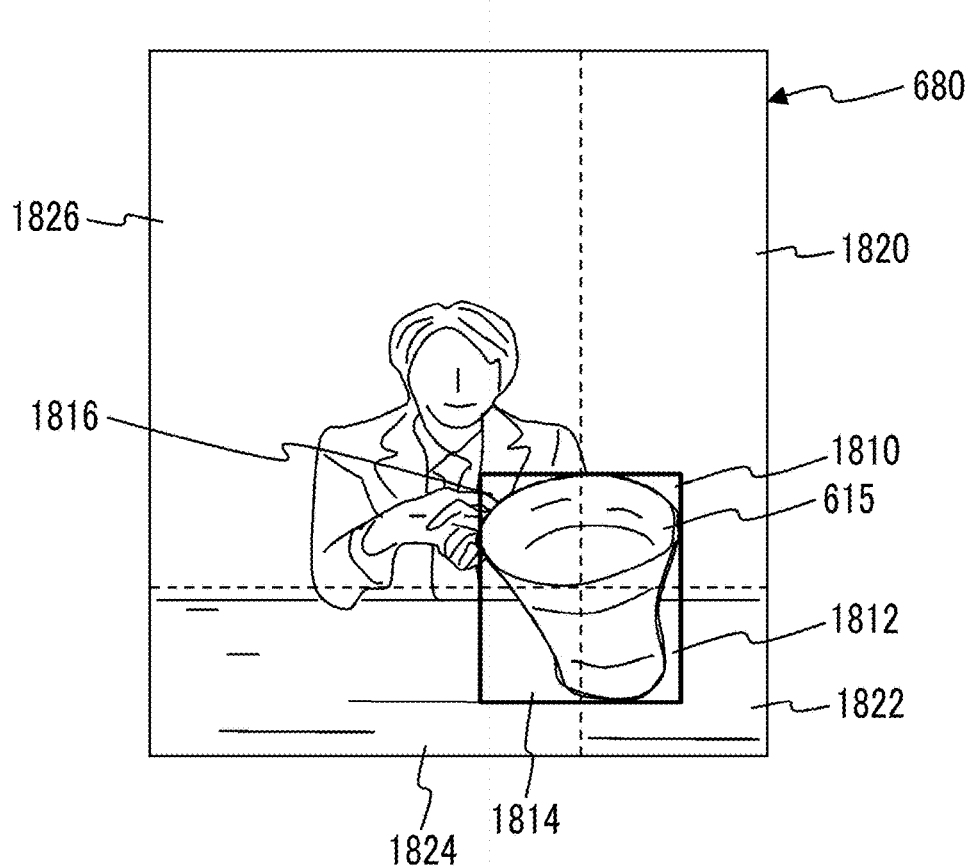
FIG. 18 is a diagram illustrating a process example according to the exemplary embodiment.

FIG. 18 is a diagram illustrating a process example according to the exemplary embodiment.

The example in FIG. 18 is equivalent to the image 680 illustrated in the example in (c) of FIG. 6. Whether or not the position is outside the processing target image 615 is determined using a circumscribed rectangle of the processing target image 615.

FIG. 18 illustrates an example in which the circumscribed rectangle is divided into four section regions, that is, an inner and upper right section region 1810, an inner and lower right section region 1812, an inner and lower left section region 1814, and an inner and upper left section region 1816, as the inside of the processing target image 615. Further, FIG. 18 illustrates an example in which the outside of the circumscribed rectangle is divided into four section regions, that is, an outer and upper right section region 1820, an outer and lower right section region 1822, an outer and lower left section region 1824, and an outer and upper left section region 1826, as the outside of the processing target image 615.

Division into more sections may be performed in addition to the four sections, or division into two or three sections may be performed. The shape of the section may be any shape in addition to a rectangle. The shape of the section may be a polygon such as a triangle or a hexagon, for example.

In a case where the operation received by the operation receiving module 105 indicates click, and the position received by the operation receiving module 105 is within any of the above sections, edit assigned to this section may be performed.

In a case where the operation received by the operation receiving module 105 indicates movement (consecutive positions), and the first position received by the operation receiving module 105 is within any of the above sections, edit assigned to the first section may be performed.

In a case where the operation received by the operation receiving module 105 indicates movement (consecutive positions), and the last position received by the operation receiving module 105 is within any of the above sections, edit assigned to the last section may be performed.

Figure 19:
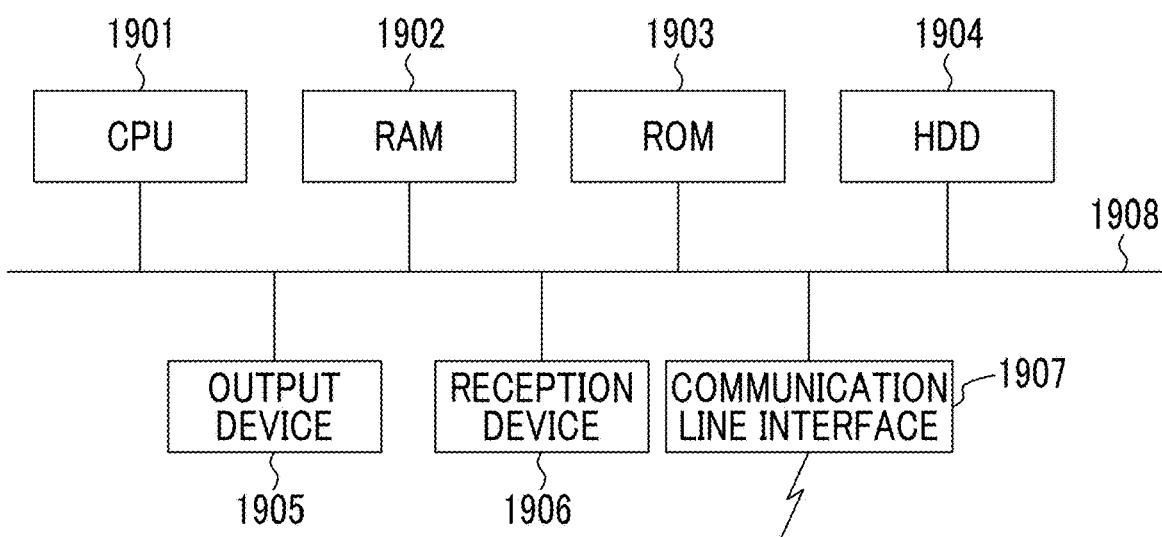
FIG. 19 is a block diagram illustrating a hardware configuration example of a computer realizing the exemplary embodiment.

A hardware configuration of a computer executing a program as the exemplary embodiment is a hardware configuration of a general computer as exemplified in FIG. 19, and the computer is, specifically, a personal computer or a computer serving as a server. In other words, as a specific example, a CPU 1901 is used as a processing unit (calculation unit), and a RAM 1902, a ROM 1903, and an HDD 1904 are used as a storage device. As the HDD 1904, for example, an HDD (abbreviation for Hard Disk Drive), an SSD (abbreviation for a solid state drive) that is a flash memory, or the like may be used. The computer includes the CPU 1901 executing programs and the like for the operation receiving module 105, the image receiving module 110, the processing module 115, the cutout processing module 120, the editing module 125, and the display module 130; the RAM 1902 storing the programs or data; the ROM 1903 storing a program or the like for activating the computer; the HDD 1904 which is an auxiliary storage device that stores a background image, an image as the processing target, the positional relationship-corresponding processing table 900, and the like; a reception device 1906 that receives data based on an operation (including an action, a sound, a line of vision, and the like) of the user on a keyboard, a mouse, a touch screen, a microphone, or a camera (including a visual line detection camera or the like); an output device 1905 such as a CRT, a liquid crystal display, or a speaker; a communication line interface 1907 for a connection to a communication network, such as a network interface card; and a bus 1908 connecting the above-described components to each other in order to transmit and receive data. Such a plurality of computers may be connected to each other via a network.

Among the above-described exemplary embodiments, in a case of the embodiment based on a computer program, the computer program which is software is read to a system having the present hardware configuration, and the embodiment is realized through cooperation between the software and the hardware resources.

The hardware configuration illustrated in FIG. 19 corresponds to one configuration example, and the exemplary embodiment is not limited to the configuration illustrated in FIG. 19, and any configuration in which the modules described in the exemplary embodiment can be executed may be used. For example, some of the modules may be configured with dedicated hardware (for example, an application specific integrated circuit (ASIC) or a field-programmable gate array (FPGA)), some of the modules may be provided in an external system, and may be connected to a communication line, and such a plurality of systems illustrated in FIG. 19 may be connected to each other via a communication line so as to operate in cooperation therebetween. Particularly, the modules may be incorporated not only into a personal computer but also into a portable information communication apparatus (including a mobile phone, a smartphone, a mobile apparatus, a wearable computer, and the like), an information appliance, a robot, a copier, a facsimile, a scanner, a printer, a multi-function peripheral (an image processing apparatus having two or more functions of a scanner, a printer, copier, and a facsimile).

The program may be stored on a recording medium so as to be provided, and the program may be provided by using communication means. In this case, for example, the program may be understood as the invention of a "non-transitory computer readable medium storing the program".

The "non-transitory computer readable medium storing the program" indicates a computer readable recording medium storing the program, used to install, execute, and distribute the program.

Examples of the recording medium include "DVD-R, DVD-RW, and DVD-RAM" which is for a digital versatile disc (DVD) and is a standard established by the DVD Forum and "DVD+R and DVD+RW which is a standard established by DVD+RW; a read-only memory (CD-ROM), CD recordable (CD-R), and CD rewritable (CD-RW) being for a compact disc (CD); Blu-ray (registered trademark) discs; a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), and a secure digital (SD) memory card.

The whole or a part of the program may be recorded on the recording medium so as to be preserved or distributed. The program may be transmitted through communication, for example, by using a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be a part of the whole of another program or may be recorded on a recording medium along with a separate program. The program may be divided and recorded on a plurality of recording media. The program may be recorded in any restorable aspect such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a display section that displays a background image and a processing target image on a display screen;
 a receiving section that receives an input position on the display screen input by user; and
 a processing section that processes editing to the processing target image based on a relationship between the input position and a position of the processing target image;
 a change section that changes edit assigned based on the relationship between the input position and the position of the processing target image in a case where the processing target image and the background image have a predetermined relationship in area or position, wherein the predetermined relationship corresponds to any one of (1) a case where a proportion of the area of the processing target image to the background image is greater than or equal to or greater than a predetermined proportion, (2) a case where an area except for the processing target image is smaller than or equal to or smaller than a predetermined area, and (3) a case where a distance from the processing target image to an edge of the background image is smaller than or equal to or smaller than a predetermined distance, and the change section assigns edit which has been assigned to an outside of the processing target image, to an inside of the processing target image.

2. The image processing apparatus according to claim 1, wherein a plurality of types of edit is preserved for the relationship between the input position and the position of the processing target image, and the processing section selects any one of the plurality of types of edit and processing the selected edit.

3. The image processing apparatus according to claim 2, wherein, when the input position is received, the display section displays information for identifying the currently-selected edit near the input position.

4. The image processing apparatus according to claim 2, wherein, when the position is received, the display section displays information for identifying the corresponding edit among the plurality of types of edit, to allow a user to perform selection near the position.

5. The image processing apparatus according to claim 1, wherein edit is assigned to a section obtained by division into a region of the processing target image and a region of an outside of the processing target image, the receiving section receives consecutive positions, and the processing section performs the edit assigned to the section in a case where a first position among the consecutive positions received by the receiving section is within the section.

6. The image processing apparatus according to claim 5, wherein the processing section performs edit on the processing target image based on a relationship between the position, a trajectory of the position, and the processing target image.

7. The image processing apparatus according to claim 6, wherein, in a case where a first position among the consecutive positions received by the receiving section is inside the processing target image, an image of the processing target image is moved in accordance with a movement of the position.

8. The image processing apparatus according to claim 6, wherein, in a case where a first position among the consecutive positions received by the receiving section is outside the processing target image, an image of the processing target image is rotated in accordance with a movement of the position.

9. The image processing apparatus according to claim 6, wherein, in a case where a first position among the consecutive positions received by the receiving section is inside the processing target image, and a last position is outside the processing target image, enlargement processing of the processing target image is performed in accordance with a movement of the position.

10. The image processing apparatus according to claim 6, wherein, in a case where a first position among the consecutive positions received by the receiving section is outside the processing target image, and a last position is inside the processing target image, reduction processing of the processing target image is performed in accordance with a movement of the position.

11. The image processing apparatus according to claim 1, wherein edit is assigned to a section obtained by division into a region of the processing target image and a region of an outside of the processing target image, the receiving section receives consecutive positions, and the processing section performs the edit assigned to the section in a case where a last position among the consecutive positions received by the receiving section is within the section.

12. The image processing apparatus according to claim 11, wherein the processing section performs edit on the processing target image based on a relationship between the position, a trajectory of the position, and the processing target image.

13. The image processing apparatus according to claim 12, wherein, in a case where a first position among the consecutive positions received by the receiving section is inside the processing target image, an image of the processing target image is moved in accordance with a movement of the position.

14. The image processing apparatus according to claim 1, wherein, in a case where the position is at an upper portion or a lower portion of the processing target image, an image of the processing target image is vertically reversed.

15. The image processing apparatus according to claim 1, wherein, in a case where the position is at a right portion or a left portion of the processing target image, an image of the processing target image is horizontally reversed.

16. An image processing apparatus comprising:

a display section that displays a background image and a processing target image on a display screen;

a receiving section that receives an input position on the display screen input by user; and a processing section that processes editing to the processing target image based on a relationship between the input position and a position of the processing target image;

a change section that changes edit assigned based on the relationship between the input position and the position of the processing target image in a case where the processing target image and the background image have a predetermined relationship in area or position, wherein the predetermined relationship corresponds to any one of (1) a case where a proportion of the area of the processing target image to the background image is smaller than or equal to or smaller than a predetermined proportion, (2) a case where an area except for the processing target image is greater than or equal to or greater than a predetermined area, and (3) a case where a distance from the processing target image to an edge of the background image is greater than or equal to or greater than a predetermined distance, and the change section assigns edit which has been assigned to an inside of the processing target image to an outside of the background image.

17. An image processing apparatus comprising:

a display section that displays a background image and a processing target image on a display screen;

a receiving section that receives an input position on the display screen input by user; and a processing section that processes editing to the processing target image based on a relationship between the input position and a position of the processing target image;

a change section that changes edit assigned based on the relationship between the input position and the position of the processing target image in a case where the processing target image and the background image have a predetermined relationship in area or position, wherein, even in a case where the processing target image and the display screen background image have the predetermined relationship in area or position, the change section does not change edit assigned to a center portion of the processing target image.

18. A non-transitory computer readable medium storing an image processing program causing a computer to function as:

a display section that displays a background image and a processing target image on a display screen;

a receiving section that receives an input position on the background image input by user; and a processing section that processes editing to the processing target image based on a relationship between the input position and a processing target image, a change section that changes edit assigned based on the relationship between the input position and the position of the processing target image in a case where the processing target image and the background image have a predetermined relationship in area or position, wherein the predetermined relationship corresponds to any one of (1) a case where a proportion of the area of the processing target image to the background image is greater than or equal to or greater than a predetermined proportion, (2) a case where an area except for the processing target image is smaller than or equal to or smaller than a predetermined area, and (3) a case where a distance from the processing target image to an edge of the background image is smaller than or equal to or smaller than a predetermined distance, and the change section assigns edit which has been assigned to an outside of the processing target image, to an inside of the processing target image.

* * * * *